United States Patent

Kodera et al.

[11] 4,009,467
[45] Feb. 22, 1977

[54] CHARACTER READER

[75] Inventors: Tsuguo Kodera, Tokyo; Kiyokazu Hanatani, Kawasaki, both of Japan

[73] Assignee: Fujitsu Ltd., Kawasaki, Japan

[22] Filed: Sept. 18, 1975

[21] Appl. No.: 614,418

[30] Foreign Application Priority Data

Sept. 28, 1974  Japan .............. 49-112203

[52] U.S. Cl. .............. 340/146.3 H; 340/146.3 AH
[51] Int. Cl.² ........................................ G06K 9/08
[58] Field of Search .......... 340/146.3 H, 146.3 AH; 178/7.6

[56] References Cited

UNITED STATES PATENTS

| | | |
|---|---|---|
| 3,337,766 | 8/1967 | Malaby .................... 340/146.3 AH |
| 3,408,458 | 10/1968 | Hennis .................... 340/146.3 AH |
| 3,458,688 | 7/1969 | Garry et al. .............. 340/146.3 H |
| 3,528,059 | 9/1970 | Spanjersberg ............. 340/146.3 H |
| 3,624,607 | 11/1971 | Mita et al. ............... 340/146.3 AH |
| 3,810,094 | 5/1974 | Mori et al. ............... 340/146.3 AH |
| 3,820,067 | 6/1974 | Shepard ................... 340/146.3 H |

OTHER PUBLICATIONS

Stockdale, "Format Control Apparatus," IBM Tech. Disclosure Bulletin, vol. 9, No. 12, May, 1967, pp. 1765–1768.

*Primary Examiner*—Leo H. Boudreau
*Attorney, Agent, or Firm*—Daniel Jay Tick

[57] ABSTRACT

A character reader recognizes characters by scanning them in lines corresponding to line marks, after detecting the line marks. The line marks are recorded corresponding to lines on a sheet where characters are recorded. Only a character detection signal related to a scanning signal within the domain determined by the line mark is extracted from scanning signals of the recorded characters.

2 Claims, 7 Drawing Figures

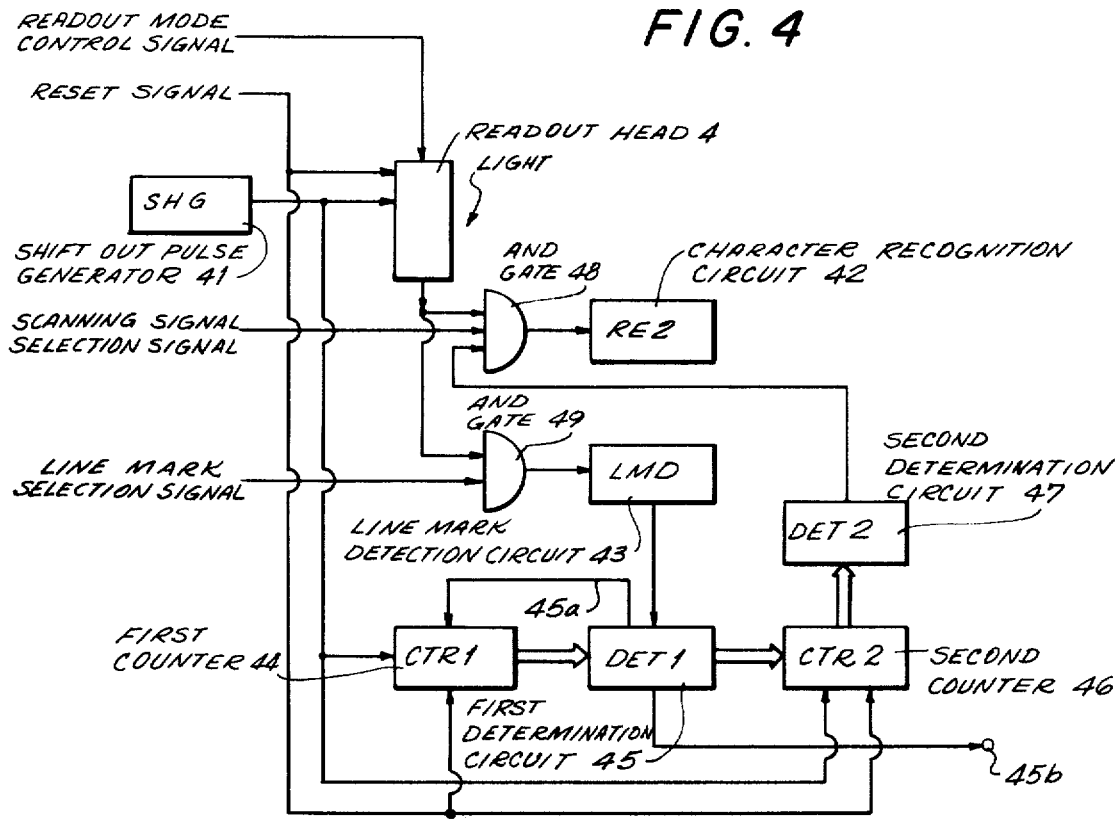

FIRST COUNTER AND FIRST DETERMINATION CIRCUIT

SECOND COUNTER AND SECOND DETERMINATION CIRCUIT

LINE MARK DETECTION CIRCUIT 43

CHARACTER READER

BACKGROUND OF THE INVENTION

The present invention relates to a character reader. More particularly, the invention relates to a character reader which provides high speed readout processing for characters on a sheet by high speed positioning of a readout head to a character domain on the sheet indicated by line marks.

The present invention is not limited to a character reader of the aforedescribed type. The character reader of the invention is capable, however, of distinctive use as a page reader, for example, which reads out characters recorded in several lines on the sheet by scanning with a sequentially switched readout head.

In general, the line marks are recorded on a sheet of a page reader for indicating the character domains. The readout head is positioned in the character domain by positioning said head at the line marks. In this case, a rough position information of the line on the sheet to be read out is supplied to the page reader, that is, to a character reader from control equipment. The readout head is thereby positioned. The readout head is then finely positioned or adjusted according to the information regarding the line marks detected by the head so that said line marks and said readout head are aligned with each other at their centers. Thus, characters on the desired line may be read out.

The aforedescribed method for reading out characters after fine adjustment of the readout head with respect to the line mark has the advantage of eliminating a control command for such accurate positioning of the readout head from the control equipment. Any suitable readout head such as, for example a flying spot scanner or diode array, may be utilized. If a flying spot scanner is utilized, the scanning line is determined by controlling the bias current. If a diode array scanner is utilized, the scanning line is determined by shifting the array in parallel. Hereinafter, operation of the character reader of the invention is explained using an example with a photodiode array scanner.

An object of the invention is to provide a character reader which overcomes the disadvantages of character readers of known type.

Another object of the invention is to provide a character reader of simple structure, which provides accurate readout at high speed.

Still another object of the invention is to provide a character reader of simple and uncomplicated structure, which is inexpensive in manufacture.

Yet another object of the invention is to provide a character reader of simple structure, which is inexpensive in manufacture, and functions efficiently, effectively, reliably and at high speed to provide accurate character readout.

BRIEF SUMMARY OF THE INVENTION

In accordance with the invention, a character reader for recognizing characters recorded in a line on a sheet corresponding to a line mark recorded on the sheet comprises a scanning device for scanning line marks and characters on a sheet within a predetermined scanning range. A detecting device detects a line mark within the predetermined scanning range and provides only an output character detection signal determined by scanning within a predetermined distance around the line mark.

In accordance with the invention, a character reader for recognizing characters recorded in a line on a sheet corresponding to a line mark recorded on the sheet comprises a scanning device in operative proximity with the sheet for scanning a predetermined position on the sheet thereby scanning line marks and characters within the predetermined position and within a predetermined scanning range. The scanning device produces a detection signal upon scanning a line mark. A line mark detecting device coupled to the scanning device detects a line mark from the detection signal of the scanning device. A position detecting device coupled to the line mark detecting device detects the position within the scanning range at which the line mark is detected. A detecting device coupled to the position detecting device scans within a predetermined distance around the position, detected by the position detecting device, within the scanning range at which the line mark is detected, considering the position as the center position, and provides an output character detection signal. A character recognizing device coupled to the detecting device recognizes characters on the sheet by recognizing the character detection signal.

The detecting device comprises a counting device coupled to the position detecting device which considers a signal representing the position, detected by the position detecting device, within the scanning range at which the line mark is detected, a negative value and advances by +1 each time a shift out pulse is provided. A shift out device supplies a shift out pulse to the counting device. A gate device coupled between the counting device and the character recognizing device becomes conductive when the counting means counts to a first predetermined value and becomes non-conductive when the counting device counts to a second predetermined value thereby controlling the feeding of the detecting signal to the character recognizing device.

BRIEF DESCRIPTION OF THE DRAWINGS

In order that the invention may be readily carried into effect, it will now be described with reference to the accompanying drawings, wherein:

FIG. 4 is a block diagram of an embodiment of the character reader of the invention;

In the Figures, the same components are identified by the same reference numerals.

DETAILED DESCRIPTION OF THE INVENTION

Figure 1:
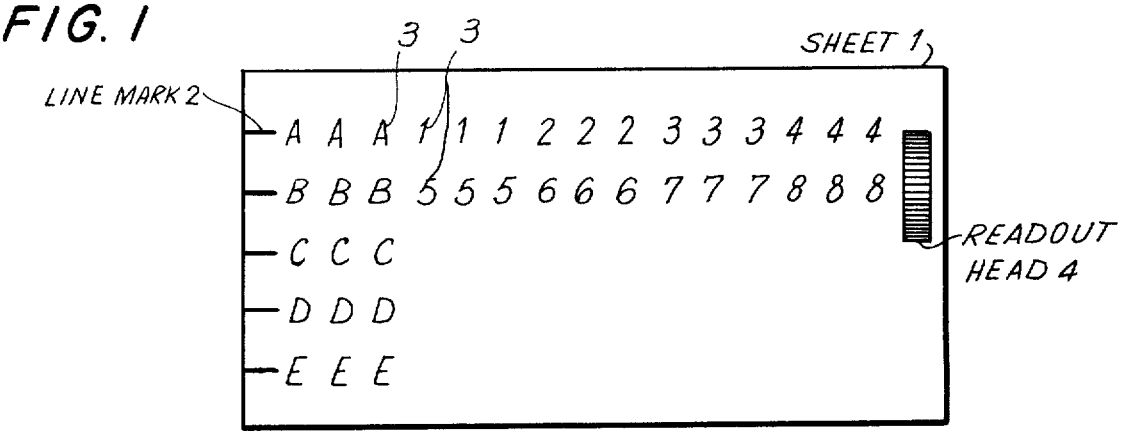
FIG. 1 is a view of an example of a sheet having line marks thereon.

FIG. 1 shows an example of a sheet 1 having line marks thereon. Each line is determined after the mechanical fine adjustment of the position of the readout head by referring to the line mark 2. The characters 3 are scanned by the readout head 4.

The readout head 4, line marks 2 and characters 3 are related, as shown in FIG. 1, by line spaces of approximately ⅓ inch or approximately 8.47 mm. Each line mark 2 is approximately 6.35 mm long. Each character 3 is approximately 2.7 mm high.

Figure 2:
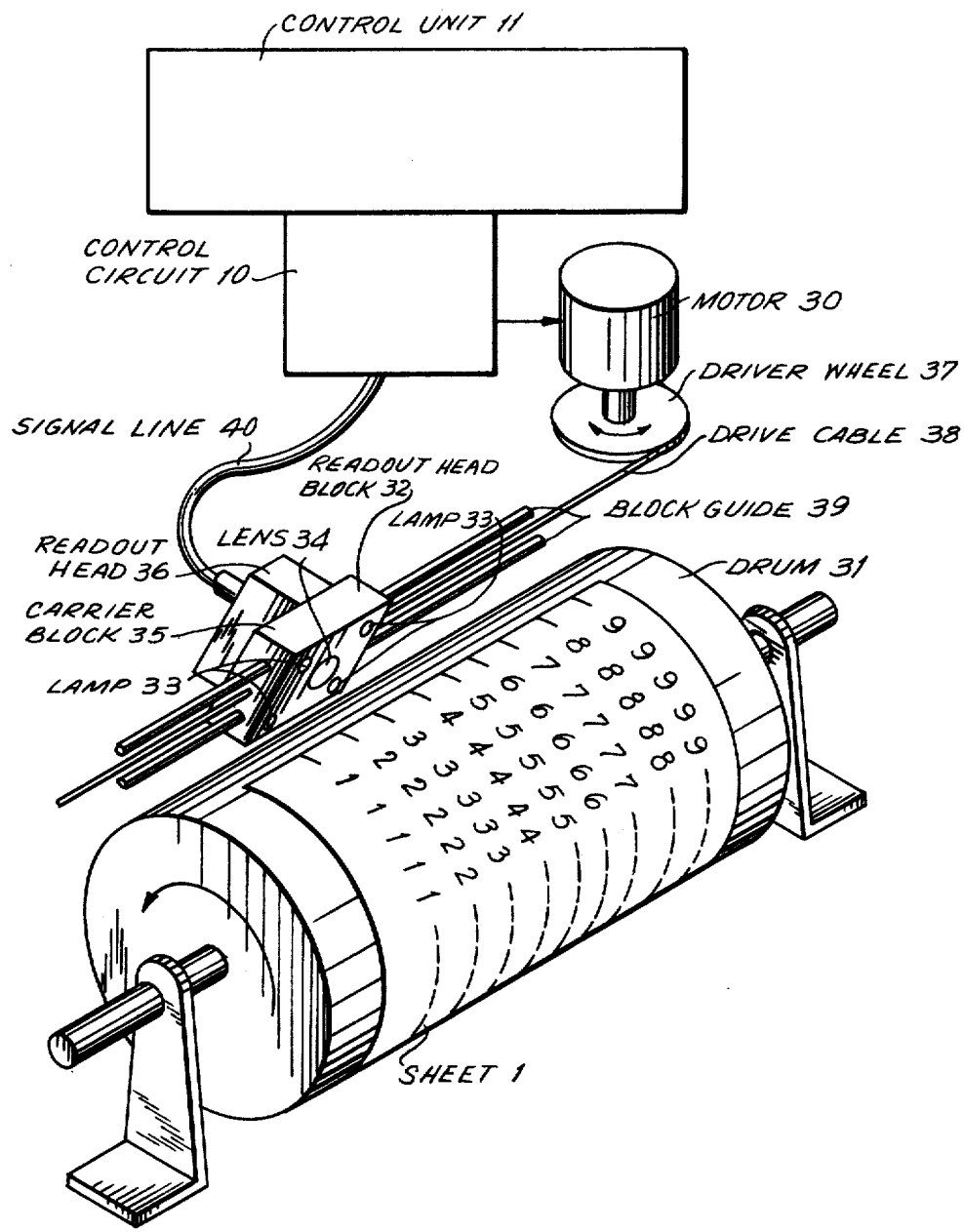
FIG. 2 is a schematic diagram of an embodiment of a character reader.

FIG. 2 shows an embodiment of a character reader. The character reader comprises a control circuit 10, which is part of a control unit 11. The control circuit 10 controls the operation of a motor 30. A drum 31 is rotatably mounted and supports the sheet 1, which is wound on said drum. A readout head block 32 is movably positioned in operative proximity with the drum 31.

The readout head block 32 comprises a plurality of lamps 33, a lens 34, a carrier block 35 and a readout head 36 mounted on the carrier block. A driver wheel 37 is coupled to the motor 30 and is rotated by said motor in either a clockwise or counterclockwise direction and functions to selectively move the readout head block 32. This is accomplished by movably mounting the carrier block 35 on a pair of spaced rod-like block guides 39 positioned in spaced operative proximity with the drum 31 and parallel to the axis of said drum. A drive cable 38 is affixed at one end to the carrier block 35 and is affixed at the other, opposite, end, to the driver wheel 37. Thus, rotation of the driver wheel 37 in either direction moves the readout head block 32 in a corresponding direction along the block guides 39.

Information read out by the readout head 36 is supplied to the control circuit 10 via a signal line 40.

A plurality of sheets 1 are wound around the drum 31, one by one, in any suitable manner and utilizing any suitable known device. Since a known winding device is used in the character reader, a detailed description is omitted. When a sheet 1 is wound around the drum 31, the control unit 11 rotates the motor 30 and the driver wheel 37 via the control circuit 10. This results in rough positioning of the readout head block 32 via the drive cable 38.

Mechanical fine adjustment or positioning of the readout head block 32 is provided utilizing the line marks detected by the readout head 36 and is undertaken via the driver wheel 37. The readout head 36 and the lens system 34 then accurately face the line marks. Thereafter, the drum 31 completes one turn and the readout head 36 reads out characters in one line which faces the readout head lens 34. Each turn of the drum 31 covers part of a revolution.

If there are not characters which can be read, the aforedescribed operation is repeated by shifting the readout head block 32 to the next line. Thus, if there are characters in five lines on a sheet, the read out of characters for one sheet terminates when the drum 31 completes five turns. If the positioning of the readout head 36 is not completed until the end of the sheet 1 passes under said readout head and then appears under said head, or if the drum 31 is not stopped during such positioning, accurate readout of the next line is impossible. In the former case, high speed positioning of the readout head is required, resulting in high cost and technical complications. In the latter case, the readout speed is substantially reduced. If the head is positioned while the drum is rotating, and the circumference of the drum is sufficiently longer than the length of the sheet, there is no change in the substantial reduction of the readout speed.

The character reader of the present invention eliminates the aforedescribed drawbacks or disadvantages.

The character reader of the invention eliminates the aforedescribed disadvantages by determining characters by scanning the characters of the lines corresponding to the line marks. The recorded line marks corresponding to the lines in which characters on the sheet are recorded, are first detected and then the characters are scanned. Only the detection signal related to a scanning signal within the domain determined by the line mark is extracted from the scanning signals of the recorded characters.

The principle of the character reader of the invention is that the time taken for mechanical fine adjustment governs the positioning time in the known reader. This is because rough positioning using position information can be made at a high speed, but fine positioning or adjustment cannot be made at such high speed. Therefore, in the character reader of the present invention, only positioning utilizing position information is carried out and fine positioning or adjustment is omitted. For this reason, the readout head is provided with a sufficient scanning height so that it can perfectly scan the characters at least on the desired line by only rough positioning or adjustment.

Generally, if the readout head scans two lines at a time, it cannot recognize characters. Therefore, the scanning height is as important as the positioning of the readout head. Thus, for example, when the scanning height of the redout head is determined as 8 mm, which is smaller than the line space, the allowable error range of the line setting becomes ± 2.65 mm. When such a range is assured, the characters of a line may be scanned completely without scanning the characters of other lines.

As is clear from the foregoing, the scanning height can theoretically be determined up to the line space, 8.47 mm. Within the aforedescribed range, the characters of a line may be scanned without scanning the characters of other lines. In this case, the allowable error range becomes ± 2.88 mm, which is (8.47 − 2.7) divided by 2. This is a limit, because if the range is widened further, characters in other lines may also be scanned.

Figure 3:
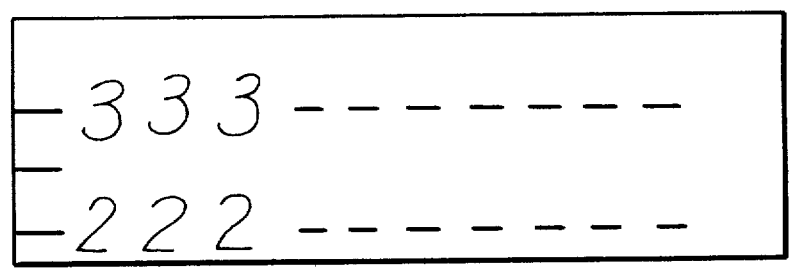
FIG. 3 is a view, on an enlarged scale, of part of a sheet having line marks thereon.

In the character reader of the invention, the aforedescribed allowable error range is widened, for example, to ± 4.2 mm. The resultant scanning signal of characters in other lines is removed and only the extracted character signals of selected lines are provided as the readout signals. For this purpose, for a sheet of the type shown in FIG. 3, only the scanning signals of characters of lines having line marks near the center of the scanning height are extracted. Thus, for example, if the line space is 8.47 mm and the allowable error range is ± 4.2 mm, a scanning signal equivalent to 8.1 mm with the addition of a character height of 2.7 mm is extracted for recognition.

The domain extracted for the recognition of the readout head is hereinafter called the extraction domain. The extraction domain may, of course, be 8.1 mm or less, and, theoretically, it must be allowable in character height, such as, for example, 2.7 mm in the lowest case. Practically, however, even in the case of printed characters, characters in the same line may be printed zig-zag vertically. Therefore, a usually appropriate extraction domain is determined at the intermediate value of 2.7 mm and 8.1 mm, which is, 6 mm.

On the other hand, the scanning height of the readout head determined at a value greater than the line space, about 12 mm, for example, is the most appropriate concerning the shifting of the line mark.

FIG. 4 shows an embodiment of the character reader of the invention. In FIG. 4, a shift out pulse generator 41 for reading scanning signals is connected to the readout head 4 and to a first counter 44 and a second counter 46. A readout mode control signal is supplied to the readout head 4. A reset signal is supplied to the readout head 4 and to the first counter 44 and the second counter 46. The readout head 4 has an output connected to a first input of an AND gate 48 and to a first input of an AND gate 49.

A scanning signal selection signal is supplied to the second input of the AND gate 48. A line mark selection signal is supplied to the second input of the AND gate 49. The output of the AND gate 48 is connected to the input of a character recognition circuit 42. The output of the AND gate 49 is connected to the input of a line mark detection circuit 43.

A first determination circuit 45 has inputs connected to corresponding outputs of the first counter 44 via a cable or plurality of leads, an output connected to an input of said first counter via a feedback connection 45a, and an output connected to an output terminal 45b. A second determination circuit 47 has inputs connected to corresponding outputs of the second counter 46 via a cable or plurality of leads, and an output connected to the third input of the AND gate 48. The second counter 46 has a plurality of inputs connected to corresponding outputs of the first determination circuit 45 via a cable or plurality of leads.

Figure 5:
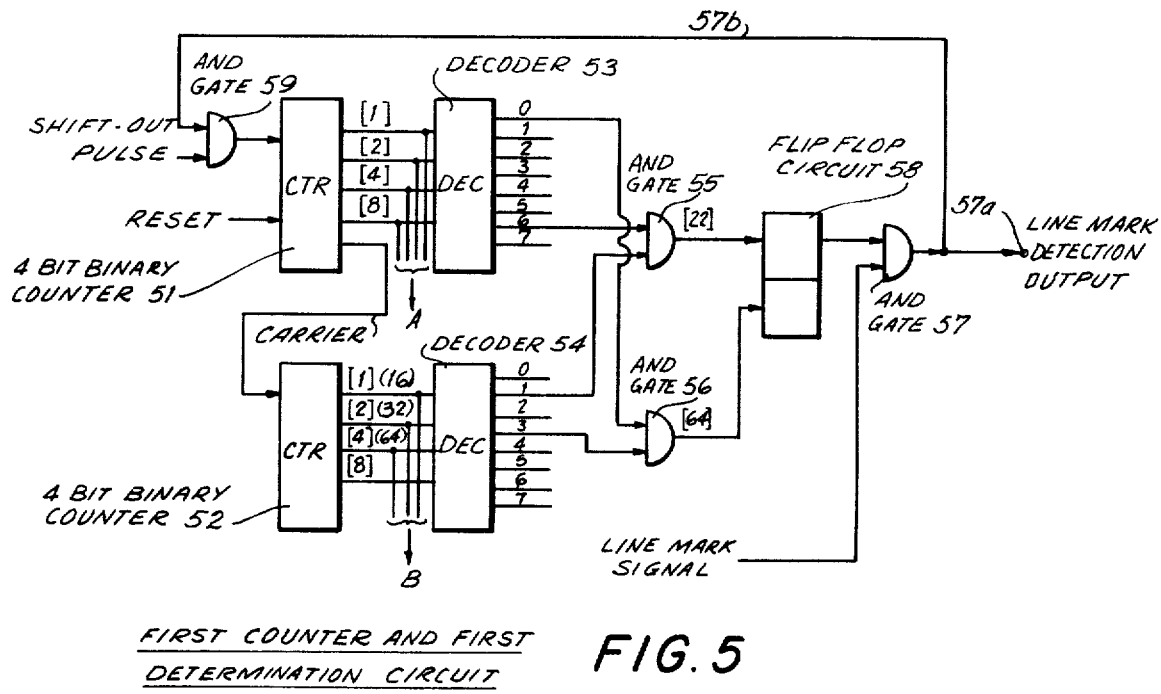
FIG. 5 is a block diagram of an embodiment of the first counter and the first determination circuit of the character reader of FIG. 4.

FIG. 5 shows an embodiment of the first counter 44 and the first determination circuit 45 of the character reader of FIG. 4. In FIG. 5, the outputs of a 4 bit binary counter 51 are connected to corresponding inputs of a decoder 53 and an output of said counter is connected to the input of a 4 bit binary counter 52. The outputs of the 4 bit binary counter 52 are connected to corresponding inputs of a decoder 54. Each of the decoders 53 and 54 has a plurality of outputs 0 through 7. The 0 output of the decoder 53 is connected to a first input of an AND gate 56 and the 6 output of said decoder is connected to a first input of an AND gate 55. The 1 output of the decoder 54 is connected to the second input of the AND gate 55 and the 3 output of said decoder is connected to the second input of the AND gate 56. The output of the AND gate 55 is connected to the set input of a flip flop circuit 58 and the output of the AND gate 56 is connected to the reset input of said flip flop circuit.

The output of the flip flop circuit 58 is connected to a first input of an AND gate 57. A line mark signal is supplied to the second input of the AND gate 57. The output of the AND gate 57 is connected to a line mark detection output 57a and is connected to a first input of an AND gate 59 via a feedback connection 57b. A shift out pulse is supplied to the second input of the AND gate 59. The output of the AND gate 59 is connected to an input of the counter 51 and a reset signal is supplied to another input of said counter.

Figure 6:
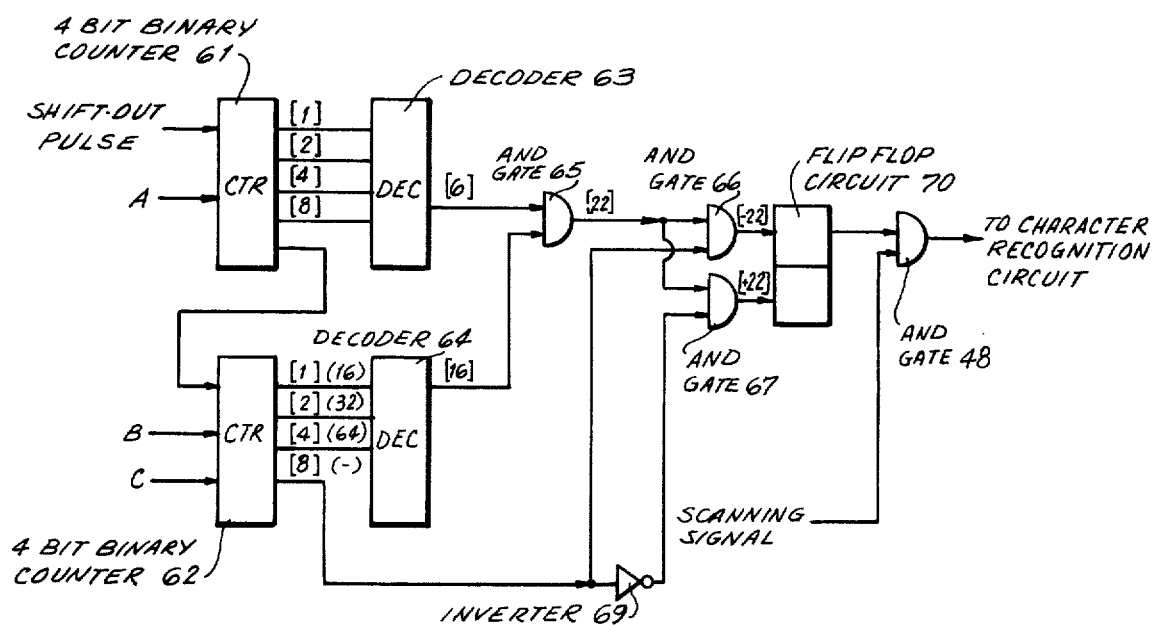
FIG. 6 is a block diagram of an embodiment of the second counter and the second determination circuit of the character reader of FIG. 4.

FIG. 6 shows an embodiment of the second counter 46 and the second determination circuit 47 of the character reader of FIG. 4. In FIG. 6, a shift out pulse is supplied to an input of a 4 bit binary counter 61 and the outputs of the 4 bit binary counter 51 of FIG. 5, indicated by A, are supplied to another input of the counter 61. An output of the counter 61 is connected to an input of a 4 bit binary counter 62. The outputs of the 4 bit binary counter 52 of FIG. 5, indicated by B, are supplied to another input of the counter 62. A logical 1 signal, indicated by C is supplied to a third input of the counter 62.

The counter 61 has a plurality of outputs connected to corresponding inputs of a decoder 63. The counter 62 has a plurality of outputs connected to corresponding inputs of a decoder 64. The output of the decoder 63 connected to a first input of an AND gate 65 and the output of the decoder 64 is connected to the second input of said AND gate. The output of the AND gate 65 is connected to a first input of an AND gate 66 and to a first input of an AND gate 67. An output of the 4 bit binary counter 62 is connected to the second input of the AND gate 66 and is coupled to the second input of the AND gate 67 via an inverter 69.

The output of the AND gate 66 is connected to the set input of a flip flop circuit 70 and the output of the AND gate 67 is connected to the reset input of said flip flop circuit. The output of the flip flop circuit 70 is connected to a first input of the AND gate 48. A scanning signal is supplied to the second input of the AND gate 48. The output of the AND gate 48 is connected to the character recognition circuit 42.

When the electric charge stored in the readout head 4 by the reset signal from the control unit 11 is reset, the counting results or resultant counts of the first counter 44 and the second counter 46 are also reset. The readout mode control signal is then supplied to the readout head 4 when the drum 31 commences its rotation, and the readout head starts scanning characters. The readout mode control signal makes the readout head 4 photoconductive or non-conductive. The readout head 4 receives light and stores electric charges in each of a plurality of elements in proportion to the light by means of the readout mode control signal. Successively, in the non-conductive state, the readout head 4 provides such charges as output current by means of the shift out pulse from the shift out pulse generator 41. The shift out pulse generator 41 reads out scanning signals. The current passes through a current-voltage converting amplifier (not shown in the Figures) and is subject to analog to digital conversion.

When scanning is started, the line mark selection signal is supplied to the AND gate 49, making said AND gate conductive, and causes the scanning signal from the readout head 4 to enter the line mark detection circuit 43. When the input scanning signal has a specific stroke such as, for example, 6.35 mm, the line mark detection circuit 43 produces a line mark signal at its output.

Figure 7:
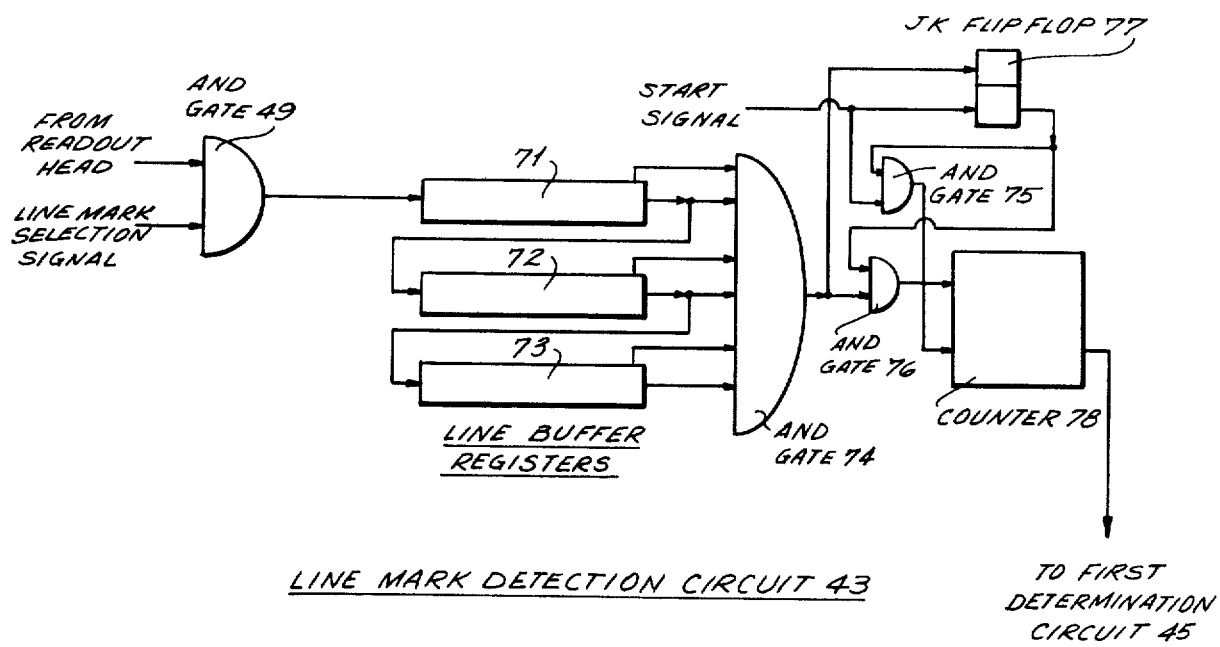
FIG. 7 is a block diagram of an embodiment of the line mark detection circuit of FIG. 4.

FIG. 7 shows an embodiment of the line mark detection circuit 43 of the character reader of FIG. 4. As shown in FIG. 7, the line mark detection circuit 43 comprises a plurality of line buffer registers 71, 72 and 73 connected to each other in tandem and each having a pair of outputs connected to corresponding inputs of an AND gate 74. The AND gate 74 has an output connected to the set input of a J K flip flop circuit 77 and to an input of an AND gate 76. A start signal is supplied to the reset input of the flip flop 77 and to an input of an AND gate 75.

The output of the flip flop 77 is connected to the second input of the AND gate 75 and to the second input of the AND gate 76. The outputs of the AND gates 75 and 76 are connected to corresponding inputs of a counter 78, which has an output connected to the first determination circuit 45.

Thus, in the line mark detection circuit 43 of FIG. 7, the video signal for one scanning obtained from the logical AND condition between the line mark selection signal and the signal from the readout head 4, which are supplied to said line mark detection circuit via the AND gate 49, is first supplied to the line buffer register 71. The video signal is then shifted sequentially to the line buffer registers 72 and 73, so that the video signal for one scanning is shifted sequentially within the several line buffer registers. Simultaneously, the video signal for the next scanning is supplied as input to the line buffer register 71.

The outputs of the line buffer registers 71, 72 and 73 are respectively connected to the AND gate 74, so that when the detection signal can be obtained from the same position in each scanning of a total of three scannings, or continuous two positions in the illustrated embodiment, it is detected that there is a mark having a specified length. The counter 78 then counts the number of detection signals which indicate that there are further marks having the specified length. The mark of specified length is checked as to whether it is sufficient as the mark in width, and in order to check that it is the qualified mark. Thus, the line mark signal is supplied to the first determination circuit 45 of the character reader.

The J K flip flop 77 of FIG. 7 supervises whether or not there is a continuous signal. On the other hand, the 4 bit binary counters 51 and 52, which consist of the first counter 44 of FIG. 4, advance one by one when receiving the shift out pulse from the shift out pulse generator 41 for reading out the scanning signals.

The decoder 53 supplies a signal 1 to the AND gates 55 and 56 each time the counter 51 counts 0 and 6. Furthermore, the counter 52 counts the carrier of the counter 51. Decoder 54 supplies an output 1 to the AND gates 55 and 56 when the counter 51 counts one carrier, that is, the bit expressing 16 of the counter 52 becomes 1, or when the counter 51 counts four carriers, that is, the bit expressing 64 becomes 1, respectively. As is apparent from the foregoing, when the first counter 44 consisting of the counters 51 and 52, counts 22, coincidence is obtained, so that the AND gate 55 sets the flip flop 58.

Meanwhile, when the first counter 44 counts 64, coincidence is obtained, so that the AND gate 56 resets the flip flop 58. The AND gate 57 is thereby not always conductive during only one scanning run, but becomes conductive in a specific period and detects the line mark signal from the line mark detection circuit 43 during such period. As hereinbefore explained, only the line mark around the center of the scanning height of the readout head 4 is considered, and if another line mark is detected, it is ignored. When the line mark is detected, the AND gate 59 closes or switches to non-conductive condition, causing the counters 51 and 52 to stop counting. Thus, the counter value or count at the time of detection of the line mark is held.

In the next step, as shown by A, B and C in FIGS. 5 and 6, the complement of the first counter 44, that is, −30 if the counting value or count of said counter is 30, supplied to the second counter 46. Thereafter, the second counter 46 counts up from −30. That is, counting steps up in succession, like −29, −28, . . . and, as is clear from FIG. 6, the counter 61 is counting 6 when the counter 62 is counting 16. In other words, when the second counter 46 is counting 22, coincidence occurs at the AND gate 65, so that said AND gate transfers a signal 1. The output of the AND gate 65 is supplied to the corresponding input of the AND gate 66, while the 8th bit signal of the counter 62 is supplied to the corresponding input of said AND gate.

The 8th bit is the sign of the second counter 46, and when it is negative, the signal 1 appears, whereas when it is positive, the signal 0 appears. Therefore, when −22 is counted first, the AND gate 66 detects coincidence and sets the flip flop circuit 70. When the second counter 46 successively counts 22, the AND gate 67 detects coincidence, resetting the flip flop 70. During such time, therefore, the scanning signal supplied to the AND gate 48 is supplied to the character recognition circuit and is recognized. In such process, the domain of ±22 is determined as the extraction domain centering on the point where the line mark is detected.

The domain of above ±22, that is, 44 in total, is previously selected at the readout head 4, so that it corresponds to the extraction domain of 6 mm or 8.1 mm, as aforementioned. As hereinbefore explained, and according to the present invention, since the first determination circuit 45 detects only the line mark around the center of the scanning height of the readout head 4, and then the second determination circuit 47 determines the predetermined extraction domain centering on the position of the detected line mark, if characters in other lines are scanned together with those in the desired line, only the scanning signals of characters of the desired line may be transmitted.

The character reader of the invention is thus a high speed reader requiring no mechanical fine adjustment in positioning of the readout head.

While the invention has been described by means of a specific example and in a specific embodiment, we do not wish to be limited thereto, for obvious modifications will occur to those skilled in the art without departing from the spirit and scope of the invention.

We claim:

1. A character reader for recognizing characters recorded in equidistantly spaced lines on a sheet, each of the lines having a line mark recorded thereat, said character reader having scanning means positioned for scanning the lines of the sheet having characters recorded therein, said scanning means producing a scanning output signal, and recognition means for recognizing the recorded line mark in the scanning output signal produced by the scanning means for each line having characters recorded therein, said recognition means detecting the line marks and recognizing the characters in the lines corresponding to the line marks via the scanning output signal, said character reader comprising positioning means for positioning the scanning means at a distance above a line being scanned sufficient to provide a scanning range between the upper and lower scanning limits of a line of characters relative to a center line through such line, said scanning range being greater than the distance between next-adjacent lines;

position detecting means for detecting where the line mark is located in the scanning range via the recognition means; and extraction means for extracting the scanning output signal of the scanning means only when said scanning means scans within specified areas including the reference positions provided by the line marks detected by the position detecting means, said recognition means recognizing characters by recognizing the scanning output signal of the extraction means.

2. A character reader as claimed in claim 1, further comprising shift out means for supplying a shift out pulse, and wherein the position detecting means produces a position signal in accordance with the location of the line mark, the position signal being made a negative value and advancing by +1 each time a shift out pulse is provided, counting means for producing a counting result, and gate means coupled between the counting means and the recognition means, said gate means becoming conductive when said counting means produces a counting result of a first predetermined value and becoming non-conductive when said counting means produces a counting result of a second predetermined value thereby controlling the transfer of the scanning output signal from the scanning means to the recognition means.

* * * * *